United States Patent
Kurabayashi

(10) Patent No.: US 10,683,053 B2
(45) Date of Patent: Jun. 16, 2020

(54) BODY FRAME STRUCTURE OF MOTORCYCLE

(71) Applicant: SUZUKI MOTOR CORPORATION, Shizuoka-Ken (JP)

(72) Inventor: Kuninari Kurabayashi, Shizuoka-Ken (JP)

(73) Assignee: Suzuki Motor Corporation (JP)

(*) Notice: Subject to any disclaimer, the term of this patent is extended or adjusted under 35 U.S.C. 154(b) by 363 days.

(21) Appl. No.: 15/856,575

(22) Filed: Dec. 28, 2017

(65) Prior Publication Data
US 2018/0215437 A1 Aug. 2, 2018

(30) Foreign Application Priority Data
Jan. 30, 2017 (JP) ................. 2017-014670

(51) Int. Cl.
| | | |
|---|---|---|
| *B62K 11/04* | (2006.01) | |
| *B62K 19/18* | (2006.01) | |
| *B62K 19/20* | (2006.01) | |
| *B62K 19/28* | (2006.01) | |
| *B62K 19/30* | (2006.01) | |
| *B62K 11/02* | (2006.01) | |
| *B62K 19/02* | (2006.01) | |

(52) U.S. Cl.
CPC ............ *B62K 19/30* (2013.01); *B62K 11/02* (2013.01); *B62K 11/04* (2013.01); *B62K 19/02* (2013.01); *B62K 19/20* (2013.01); *B62K 19/28* (2013.01)

(58) Field of Classification Search
CPC ........ B62K 11/04; B62K 19/18; B62K 19/20; B62K 19/28; B62K 25/283; B62M 7/02; B62M 7/04; B62M 7/06

USPC .................................... 180/219, 228
See application file for complete search history.

(56) References Cited

U.S. PATENT DOCUMENTS

| | | | | |
|---|---|---|---|---|
| 4,781,264 A | * | 11/1988 | Matsuzaki | B62K 11/04 180/219 |
| 7,694,985 B2 | * | 4/2010 | Hoshi | B62K 19/12 280/274 |
| 2001/0023789 A1 | * | 9/2001 | Uneta | B62K 11/04 180/218 |
| 2004/0182634 A1 | * | 9/2004 | Adachi | B62K 11/04 180/312 |

(Continued)

FOREIGN PATENT DOCUMENTS

JP  2015-054607 A  3/2015

*Primary Examiner* — Anne Marie M Boehler
(74) *Attorney, Agent, or Firm* — Barnes & Thornburg LLP

(57) ABSTRACT

A motorcycle body frame structure improves rigidity and further suppresses changes in vehicle body behavior. The body frame structure includes: a head pipe, right and left main frames connected to the head pipe, a down tube connected to the head pipe, right and left reinforcing frames installed between the down tube and corresponding right and left reinforcing frames. Each of the right and left reinforcing frames include a first and second joint portions joined to the down tube. The first joint portions are joined with corresponding right and left main frames. Each of the second joint portions include a first joint flange portion welded with corresponding right and left side surfaces of the down tube, a second joint flange portion welded with an upper surface of the down tube, and a third joint flange portion connected with the first and second joint flange portions and separated from the down tube.

10 Claims, 9 Drawing Sheets

(56) References Cited

U.S. PATENT DOCUMENTS

2013/0098701 A1* 4/2013 Hirano .................. B62K 11/04
 180/227
2015/0068829 A1* 3/2015 Ishida ................... B62K 19/04
 180/219

* cited by examiner

BODY FRAME STRUCTURE OF MOTORCYCLE

CROSS-REFERENCE TO RELATED APPLICATIONS

This application claims the benefit of priority of Japanese Patent Application No. 2017-014670, filed on Jan. 30, 2017, the entire contents of which are incorporated herein by reference.

BACKGROUND OF THE INVENTION

Field of the Invention

The present invention relates to a body frame structure of a motorcycle.

Description of the Related Art

In a saddle-type vehicle, there is known a body frame structure that includes a pair of right and left main frames extending rearward from a head pipe, a down frame extending downward from the head pipe, and a pair of right and left reinforcing members. In this body frame structure, the right reinforcing member is provided so as to straddle the down frame and the right main frame with the open portion of the U-shaped cross-section facing inward in the vehicle width direction. Similarly, the left reinforcing member is provided so as to straddle the down frame and the left main frame with the open portion of the U-shaped cross-section facing inward in the vehicle width direction. Each of one end portions of the reinforcing members is welded with the down frame and each of the other end portions of the reinforcing members is welded with the corresponding main frames (e.g., Japanese Unexamined Patent Application Publication No. 2015-54607).

SUMMARY OF THE INVENTION

The right and left reinforcing members of the conventional body frame structure are independently joined with the down frame. Thus, the conventional body frame structure still leaves room to improve rigidity of the body frame.

To solve the problems described above, it is an object of the present invention to provide a body frame structure of a motorcycle that can further improve rigidity of the body frame and can further suppress a change in the behavior of vehicle body.

To achieve the above object, an aspect of the present invention provides a body frame structure of a motorcycle including: a head pipe; a right main frame and a left main frame, each of which is connected with the head pipe and extends rearward; a down tube connected with the head pipe and extending downward; a right reinforcing frame installed between the down tube and the right main frame; and a left reinforcing frame installed between the down tube and the left main frame, wherein each of the right reinforcing frame and the left reinforcing frame includes a first joint portion and a second joint portion joined to the down tube; wherein the first joint portion of the right reinforcing frame is joined to the right main frame; wherein the first joint portion of the left reinforcing frame is joined to the left main frame; wherein the second joint portion of the right reinforcing frame includes a first joint flange portion welded with a right side surface of the down tube, a second joint flange portion welded with an upper surface of the down tube, and a third joint flange portion that is connected with the first joint flange portion and the second joint flange portion and is separated from the down tube; wherein the second joint portion of the left reinforcing frame includes a first joint flange portion welded with a left side surface of the down tube, a second joint flange portion welded with the upper surface of the down tube, and a third joint flange portion that is connected with the first joint flange portion and the second joint flange portion and is separated from the down tube; and wherein the third joint flange portion of the second joint portion of the right reinforcing frame and the third joint flange portion of the second joint portion of the left reinforcing frame are welded with each other to integrate the right reinforcing frame and the left reinforcing frame.

In preferred embodiments of the above aspect, the following modes may be provided.

It may be desired that each of the right reinforcing frame and the left reinforcing frame includes a body portion that is bridged between the first joint portion and the second joint portion and is concavely curved toward inside in a width direction of the body frame structure.

It may be desired that at least one of the right reinforcing frame and the left reinforcing frame includes a boss portion that is provided on a corresponding inner surface of the right reinforcing frame and the left reinforcing frame and can mount on a component of the motorcycle.

It may be desired that the third joint flange portions are welded with both of an outer surface and an inner surface.

It may be desired that the down tube has a hole connected with a space that separates the down tube from the third joint flange portions.

This body frame structure of the motorcycle, which can further improve rigidity of the body frame and can further suppress the change in the behavior of vehicle body.

DETAILED DESCRIPTION

Hereinafter, an embodiment of a body frame structure of a motorcycle according to the present invention will be described with reference to FIG. 1 to FIG. 9.

Figure 1:
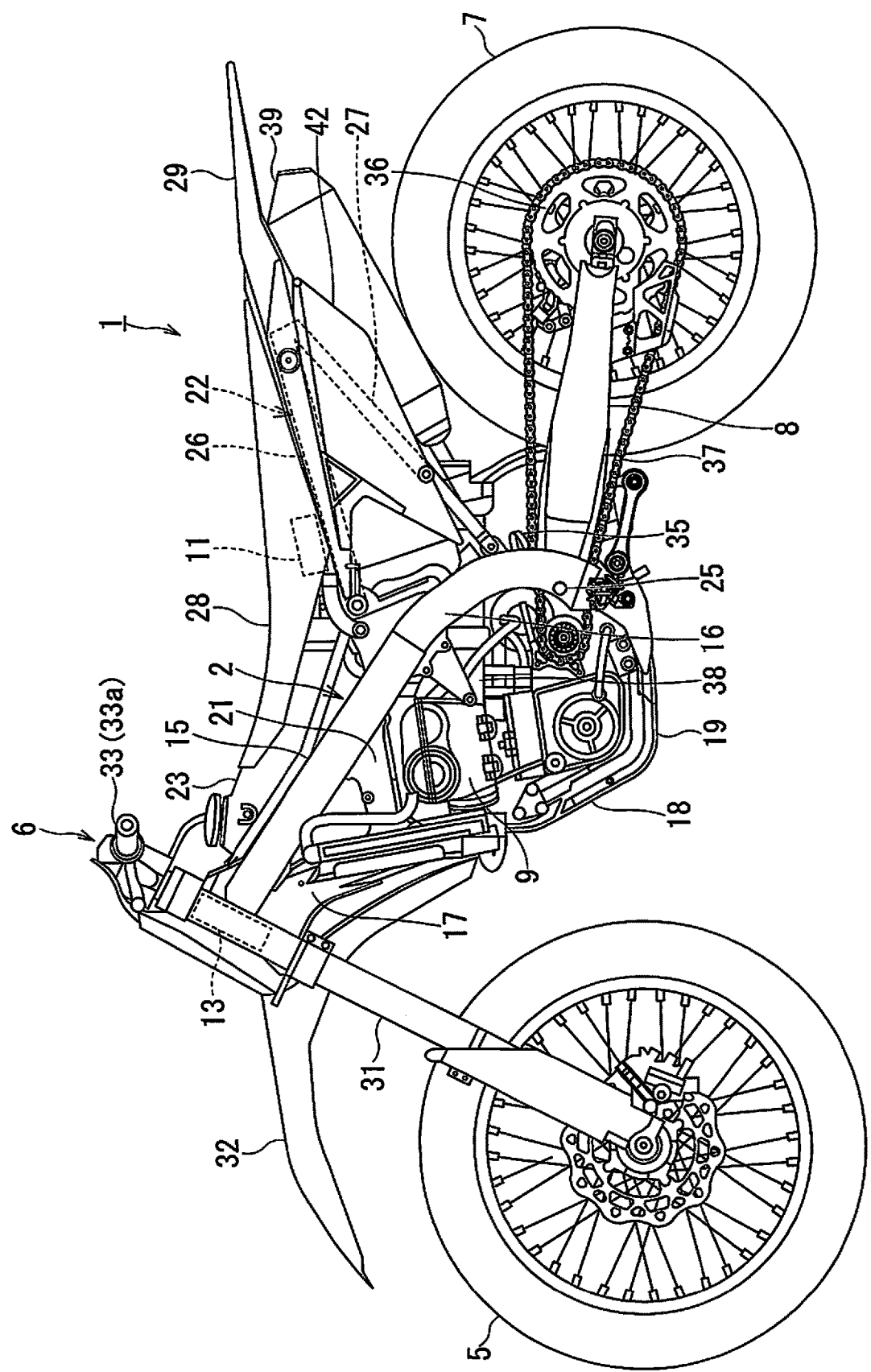
FIG. 1 is a left side view illustrating a motorcycle to which the body frame structure according to an embodiment of the present invention is applied.

FIG. 1 is a left side view illustrating a motorcycle to which the body frame structure according to the embodiment of the present invention is applied.

In the present embodiment, directional terms such as front, rear, upper, upward, lower, downward, left, and right are used with reference to a rider who rides on the motorcycle 1.

As shown in FIG. 1, the motorcycle 1 according to the embodiment of the present invention is, e.g., an off-road motorcycle such as a dual-purpose motorcycle and a motocrosser suitable for running on uneven ground, irregular ground, and rough terrain. The motorcycle 1 includes a body frame 2, a front wheel 5, a steering mechanism 6, a rear wheel 7, a swing arm 8, an engine 9, and an engine control module 11. The vehicle body frame 2 extends in the front-rear direction of the motorcycle 1 (i.e., the vehicle longitudinal direction). The front wheel 5 is disposed in front of the body frame 2. The steering mechanism 6 is provided in front of the body frame 2, and rotatably supports the front wheel 5. The rear wheel 7 is disposed behind the body frame 2. The swing arm 8 extends rearward of the body frame 2, and rotatably supports the rear wheel 7. The engine 9 is mounted on the lower center of the body frame 2. The engine control module 11 controls each operation of the engine 9.

The body frame 2 is a so-called cradle type. The body frame 2 includes a head pipe 13, a pair of right and left main frames 15, a pair of right and left pivot frames 16, a down tube 17, a joint member 18, a pair of right and left lower tubes 19, a pair of right and left bridges 21, and a rear frame 22. The head pipe 13 is disposed at the front upper end portion. The pair of right and left main frames 15 are connected with the head pipe 13, and are inclined so as to extend obliquely rearward and downward. The pair of right and left pivot frames 16 are connected with the respective rear end portions of the right and left main frames 15, and hang downward. The down tube 17 is connected with the head pipe 13, and extends downward. The joint member 18 is connected with the down tube 17, and bifurcates, i.e., branches to the right and left of the motorcycle 1. The pair of right and left lower tubes 19 are connected with the respective branched end portions of the joint member 18 to extend downward, bend in the middle thereof, and further extend rearward so as to protect the lower portion of the engine 9 and be connected with the respective lower end portions of the right and left pivot frames 16. The right bridge 21 is bridged between the right main frame 15 and the down tube 17, and the left bridge 21 is bridged between the left main frame 15 and the down tube 17. The rear frame 22 is connected with the pair of right and left pivot frames 16, and extends downward.

Each of the main frames 15 extends obliquely rearward and downward from the front end portion connected with the head pipe 13. Each of the pivot frames 16 hangs downward from the front end portion connected with the rear end portion of each of the right and left main frames 15. The down tube 17 extends downward from the end portion connected with the head pipe 13. The respective lower tubes 19 are connected with the branch end portions of the joint member 18. The rear frame 22 extends rearward from the connection end with the pivot frames 16.

The head pipe 13 is the rotation center of the steering mechanism 6. The head pipe 13 supports the steering mechanism 6 on the body frame 2.

The right and left main frames 15 also serve as tank rails. The right and left main frames 15 support a fuel tank 23 disposed above the main frames 15. The right and left main frames 15 suspend the engine 9 disposed below the fuel tank 23.

The right and left pivot frames 16 support a pivot shaft 25 that is the rotation center of the swing arm 8.

The rear frame 22 includes a pair of right and left seat rails 26 and a pair of right and left seat pillar tubes 27. The pair of right and left seat rails 26 are inclined and extended obliquely rearward and upward from the respective top portions of the right and left pivot frames 16. The pair of right and left seat pillar tubes 27 extend obliquely upward and rearward from the rear sides of the respective central portions of the right and left pivot frames 16, and are connected to the respective rear portions of the seat rails 26. The seat rails 26 support a seat 28 and a rear fender 29 that extends rearward of the seat 28 and covers the upper part of the rear wheel 7.

The steering mechanism 6 includes a pair of right and left front forks 31, a front fender 32, and a handle 33 that is connected to the top of the front fork 31. The pair of right and left front forks 31 rotatably support the front wheel 5. The front fender 32 covers the region above the front wheel 5. A non-illustrated suspension mechanism is installed in each of the front forks 31. A rider can steer the front wheel 5 to the right or left by gripping the handles 33. The handle 33 on the right side of the motorcycle 1 is an accelerator grip 33a.

The swing arm 8 is swingably supported with the body frame 2, and rotatably supports the rear wheel 7. A rear suspension unit 35 is installed between the swing arm 8 and the body frame 2. The rear suspension unit 35 buffers the force transmitted from the rear wheel 7 to the body frame 2.

The rear wheel 7 includes a driven sprocket 36. A drive chain 37 passes over the driven sprocket 36, and transmits the driving force from the engine 9 to the rear wheel 7.

The engine 9 is, e.g., an internal combustion engine of four cycles. The engine 9 includes a non-illustrated piston configured to reciprocate in the vertical direction of the motorcycle 1 and a non-illustrated cylinder that houses the piston. The engine 9 is disposed between the down tube 17 and the main frames 15. The engine 9 includes a fuel injection device 38 that supplies air-fuel mixture. The engine 9 is connected to an exhaust muffler 39. The exhaust muffler 39 extends toward the rear of the motorcycle 1. The exhaust muffler 39 discharges exhaust gas of the engine 9 to the rear of the motorcycle 1.

The motorcycle 1 further includes a frame cover 42 that covers the right and left of the space below the seat 28.

Next, a detailed description will be given of the body frame structure of the motorcycle 1 according to the embodiment of the present invention.

Figure 2:
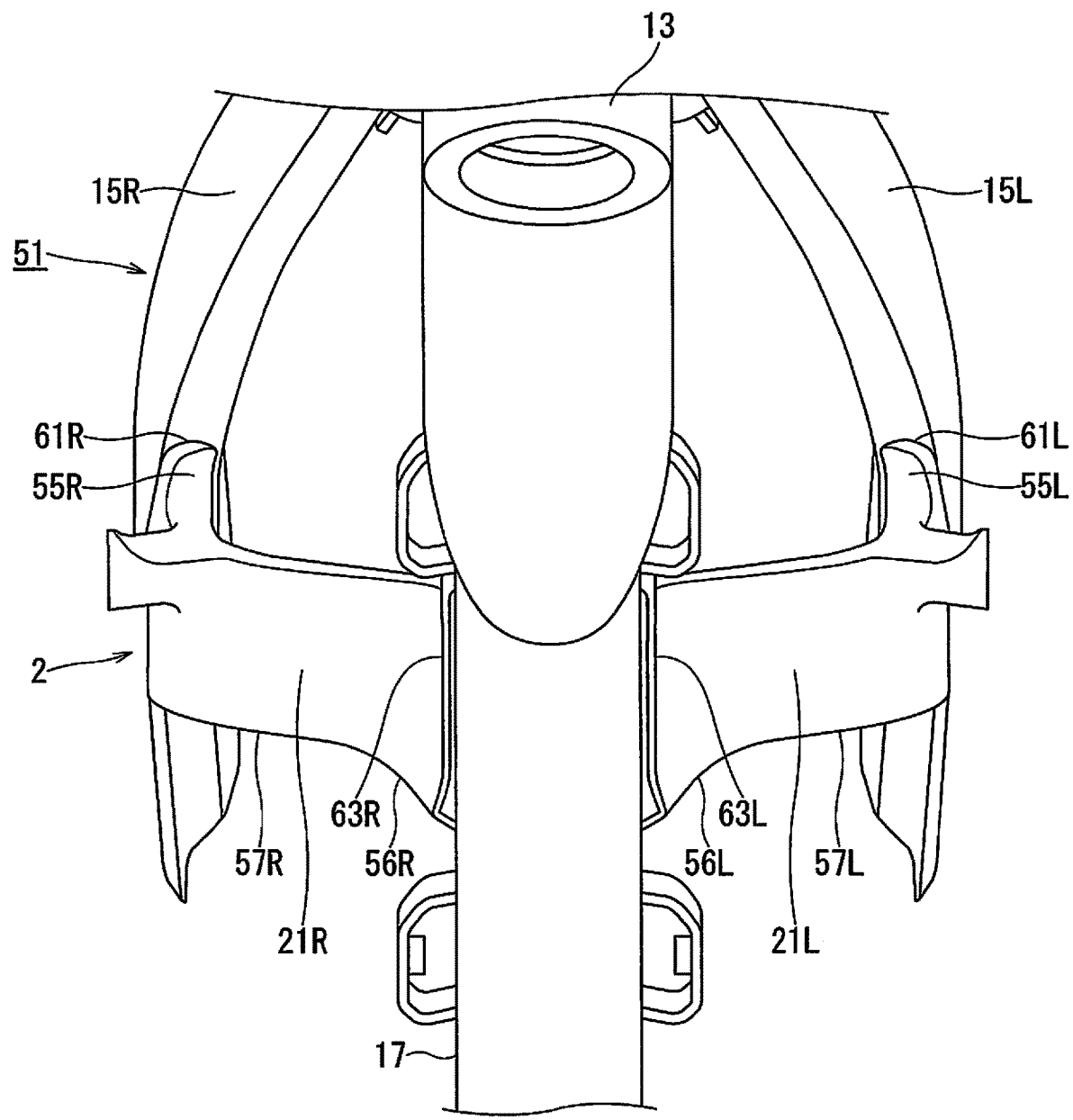
FIG. 2 is a front view of the body frame structure according to the embodiment of the present invention.

FIG. 2 is a front view of the body frame structure according to the embodiment of the present invention.

Figure 3:
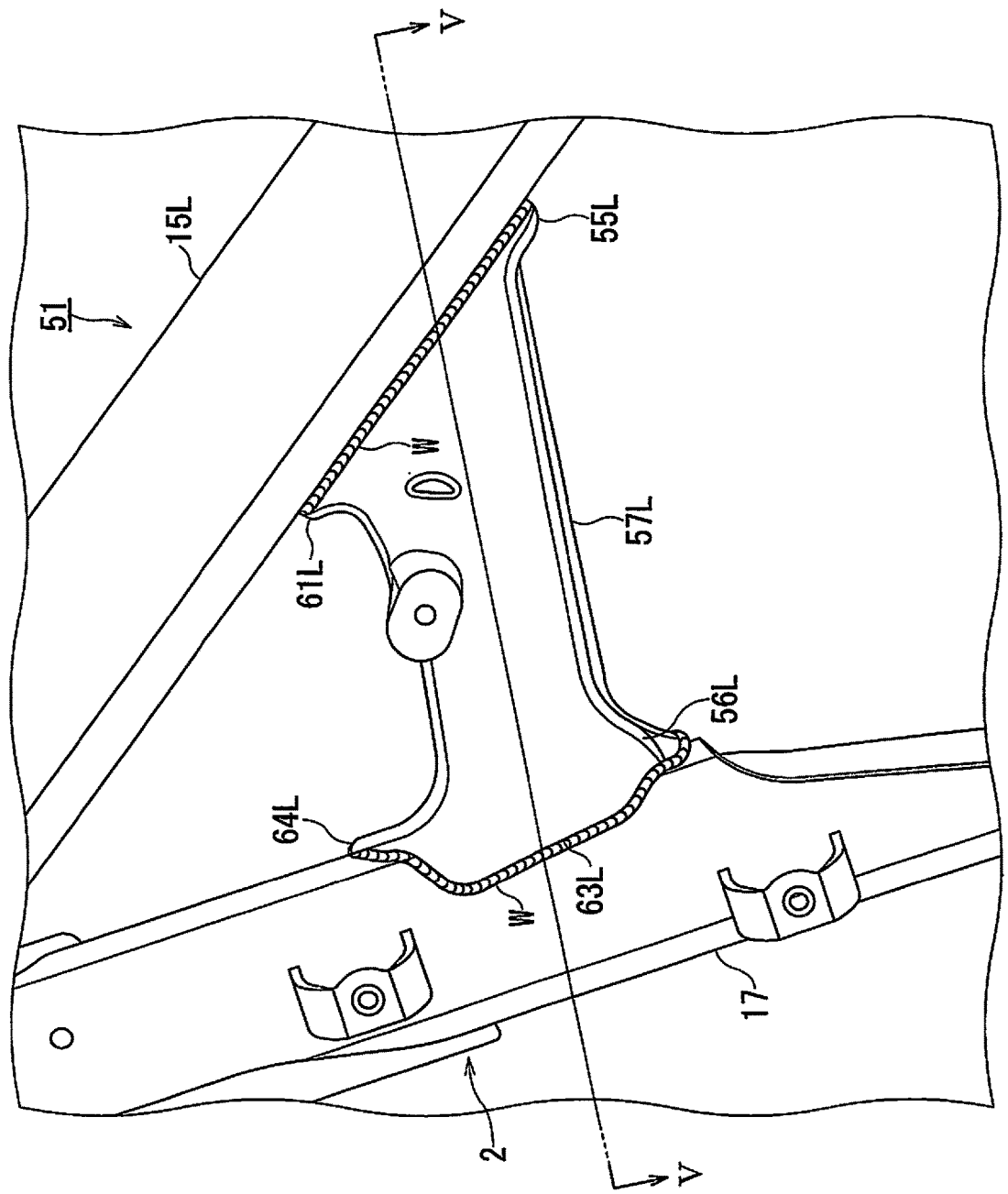
FIG. 3 is a left side view of the body frame structure according to the embodiment of the present invention.

FIG. 3 is a left side view of the body frame structure according to the embodiment of the present invention.

Figure 4:
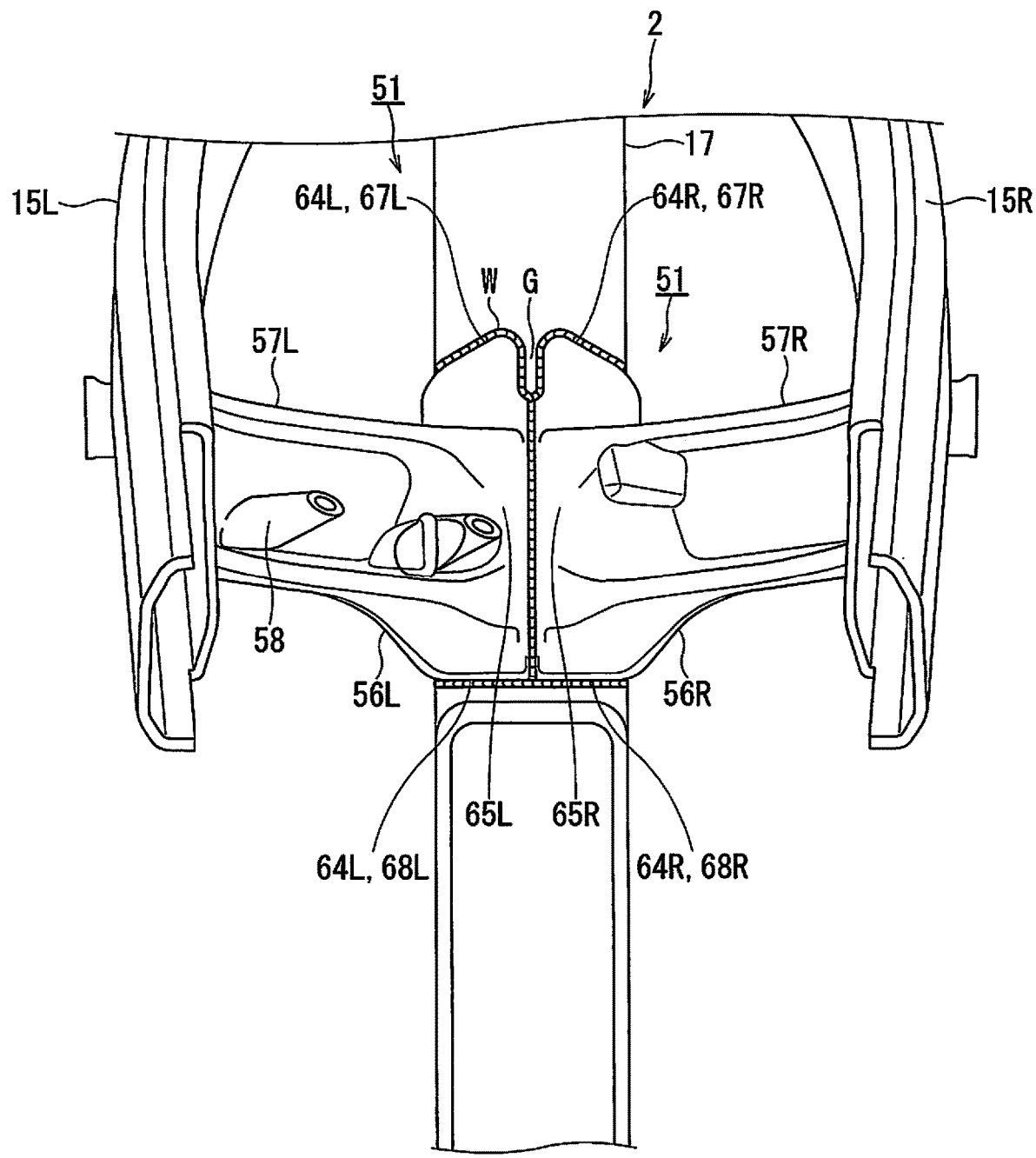
FIG. 4 is a rear view of the body frame structure according to the embodiment of the present invention.

FIG. 4 is a rear view of the body frame structure according to the embodiment of the present invention.

Figure 5:
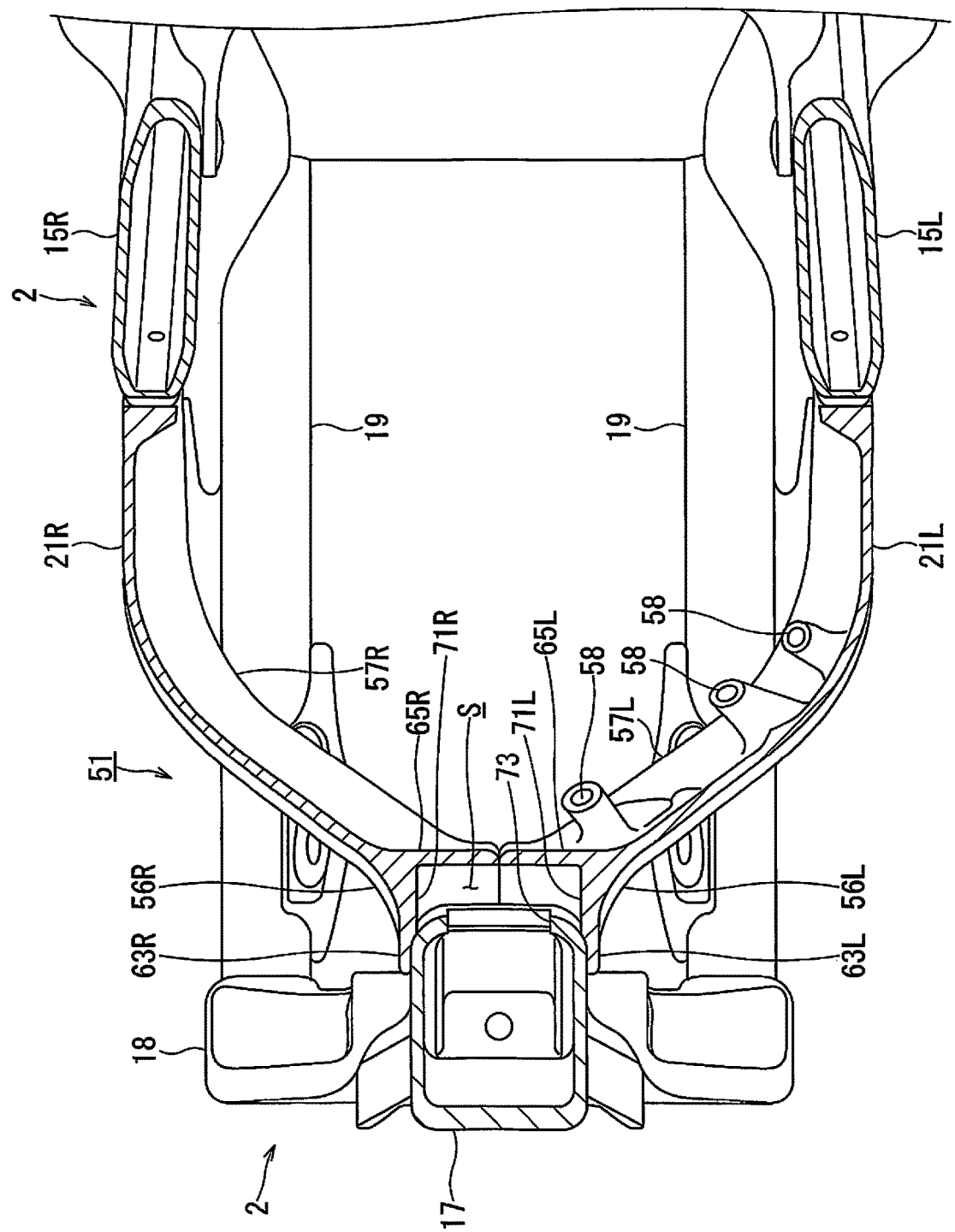
FIG. 5 is a cross-sectional view of the body frame structure according to the embodiment of the present invention.

FIG. 5 is a cross-sectional view of the body frame structure according to the embodiment of the present invention taken along the line of V-V in FIG. 3.

Figure 6:
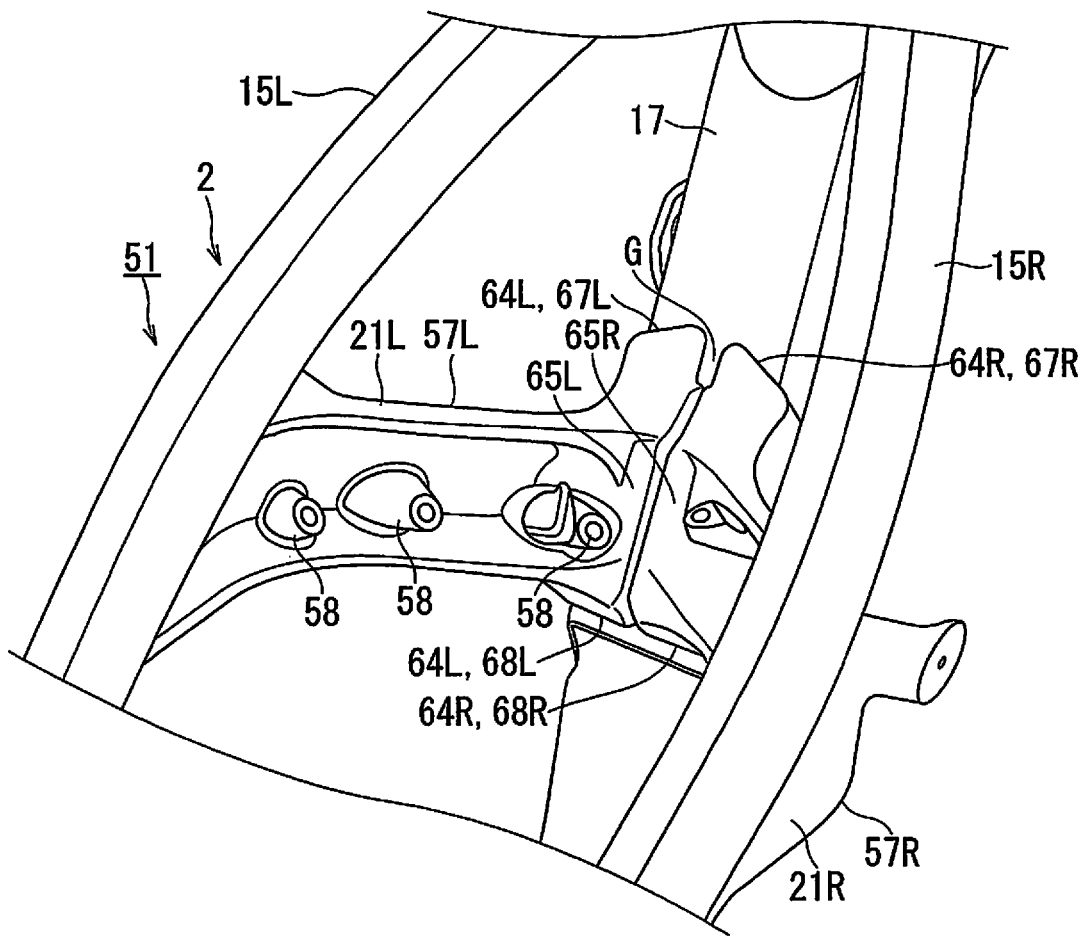
FIG. 6 is a perspective view illustrating the body frame structure according to the embodiment of the present invention as viewed from the upper right rear.

FIG. 6 is a perspective view illustrating the body frame structure according to the embodiment of the present invention as viewed from the upper right rear.

Figure 7:
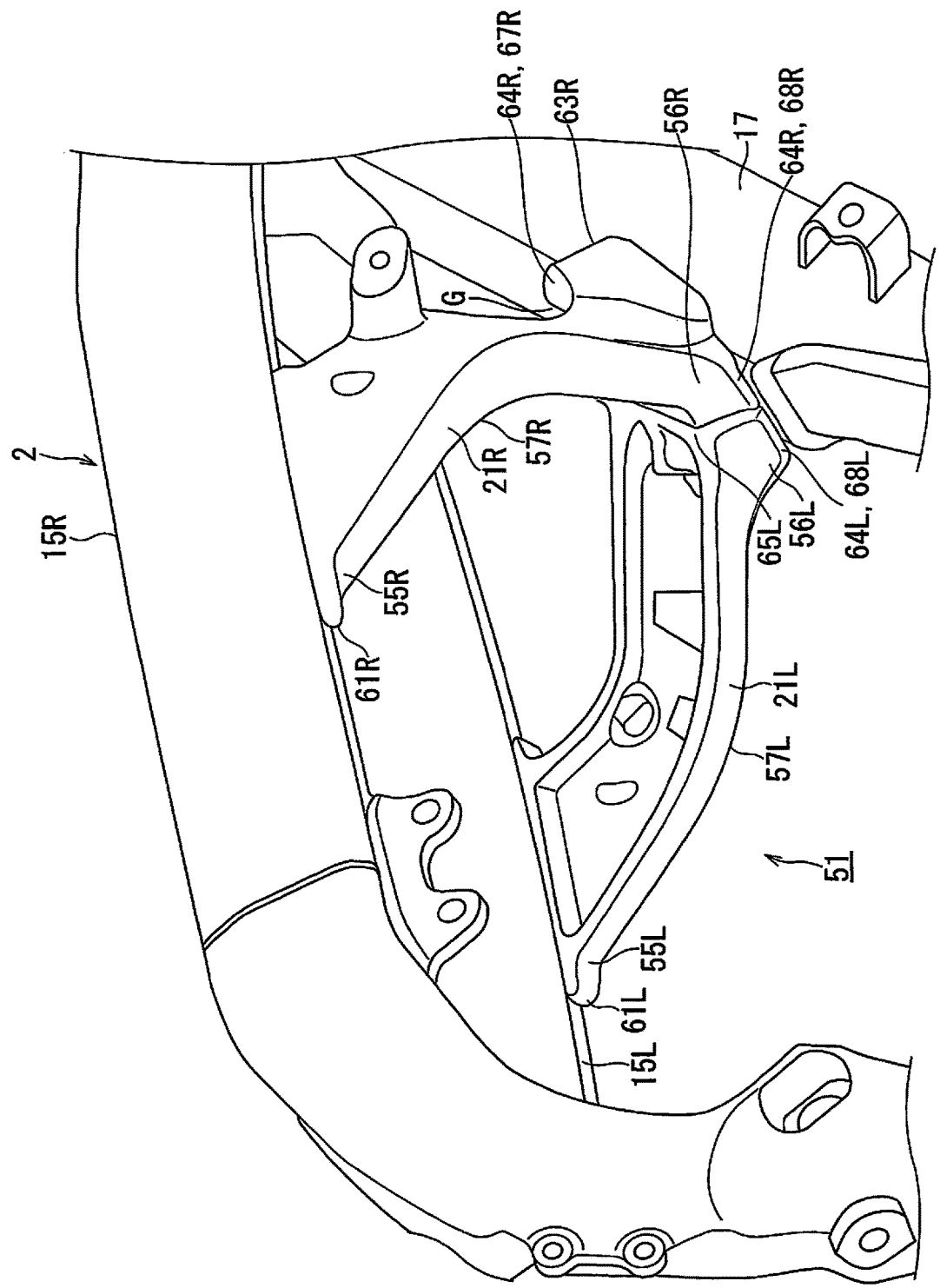
FIG. 7 is a perspective view illustrating the body frame structure according to the embodiment of the present invention as viewed from the lower right rear.

FIG. 7 is a perspective view illustrating the body frame structure according to the embodiment of the present invention as viewed from the lower right rear.

Figure 8:
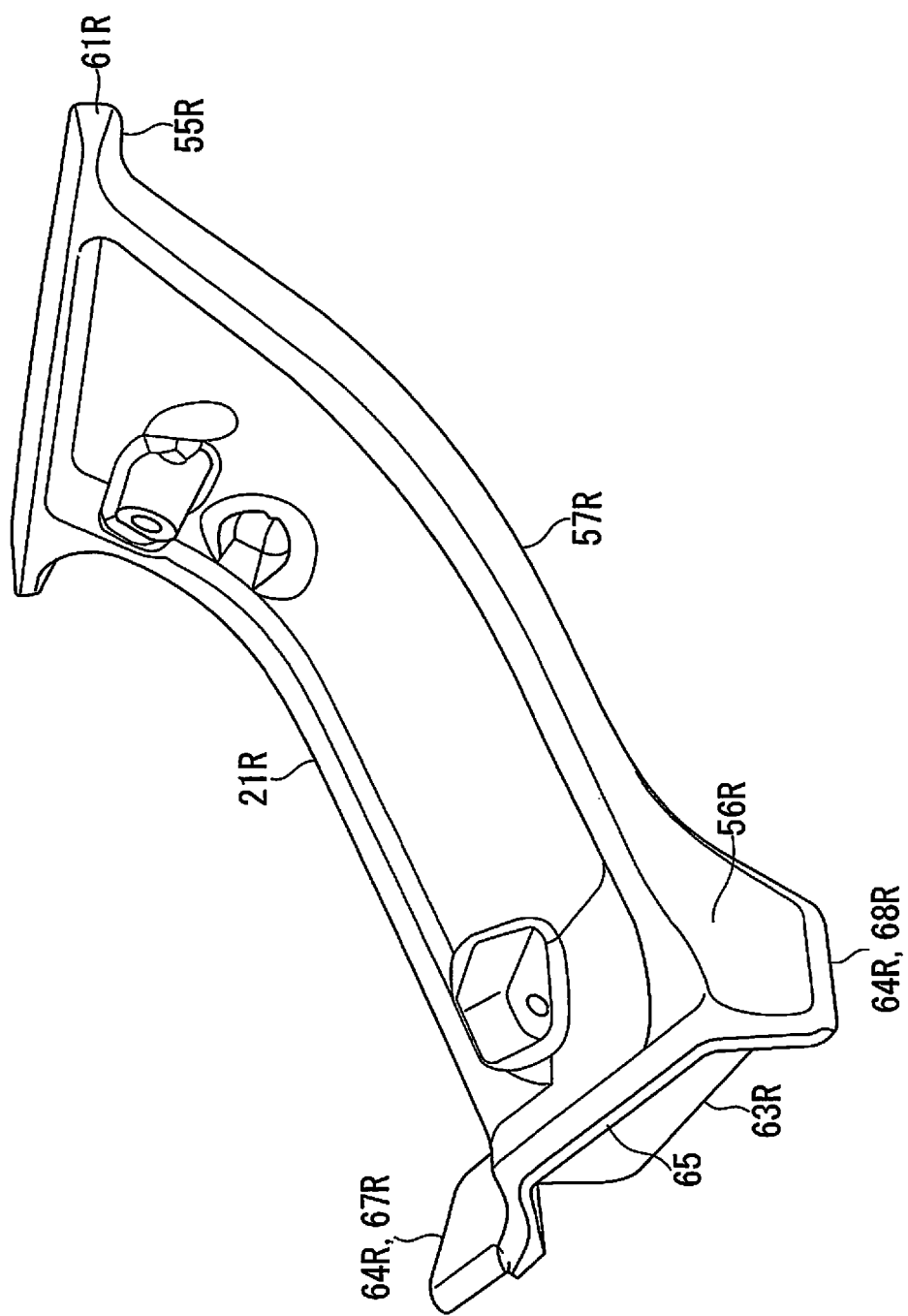
FIG. 8 is a perspective view of a reinforcing frame of the body frame structure according to the embodiment of the present invention.
Figure 9:
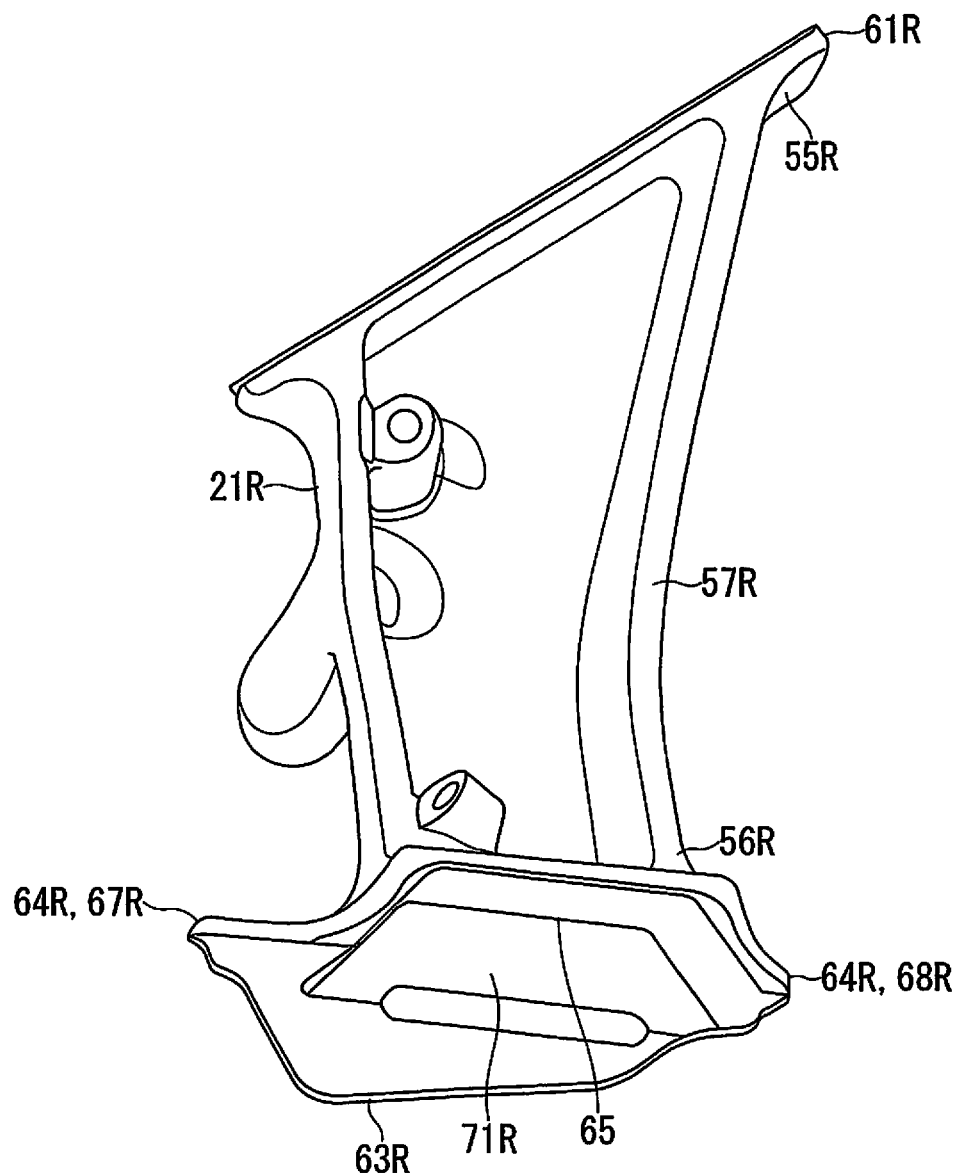
FIG. 9 is another perspective view of the reinforcing frame of the body frame structure according to the embodiment of the present invention.

FIG. 8 and FIG. 9 are perspective views of the reinforcing frame of the body frame structure according to the embodiment of the present invention.

For each pair of right and left and components shown in FIG. 2 to FIG. 7, "R" is attached to the suffix (i.e., the final letter) of the reference sign of the component on the right side and "L" is attached to the suffix of the reference sign of the component on the left side. In FIG. 8 and FIG. 9, the reinforcing frame on the right side is shown.

As shown in FIG. 2 to FIG. 7, the body frame structure 51 of the motorcycle 1 according to the present embodiment includes the head pipe 13, the pair of right and left main frames 15R and 15L connected with the head pipe 13 and extending rearward, the down tube 17 connected with the head pipe 13 and extending downward, and the pair of right and left bridges 21R and 21L provided as the pair of right and left reinforcing frames.

Each of the bridges 21R and 21L is, e.g., an integrally molded product of casting. The right bridge 21R is mounted between the right main frame 15R and the down tube 17, and straddles between the right main frame 15R and the down tube 17. The right bridge 21R includes a first joint portion 55R joined to the right main frame 15R and a second joint portion 56R joined to the down tube 17. Similarly, the left bridge 21L is mounted between the left main frame 15L and the down tube 17, and straddles between the left main frame 15L and the down tube 17 such that the down tube 17 and the main frames 15R and 15L are reinforced. The left bridge 21L includes a first joint portion 55L joined to the left main frame 15L and a second joint portion 56L joined to the down tube 17.

The bridge 21R includes a body portion 57R that is bridged between the first joint portion 55R and the second joint portion 56R. The body portion 57R is concavely curved toward the inside in the width direction of the body frame structure 51. Similarly, the bridge 21L includes a body portion 57L that is bridged between the first joint portion 55L and the second joint portion 56L. The body portion 57L is concavely curved toward the inside in the width direction of the body frame structure 51.

Further, the bridge 21L includes a boss portion 58 that is provided on an inner surface of the bridge 21L and can mount on a component of the motorcycle 1.

The first joint portions 55R and 55L are provided at one end portions of the respective bridges 21R and 21L. The first joint portion 55R includes an upper joint flange 61R that is welded with the bottom surface of the main frame 15R so as to fix the bridge 21R to the main frame 15R. Similarly, the first joint portion 55L includes an upper joint flange 61L that is welded with the bottom surface of the main frame 15L so as to fix the bridge 21L to the main frame 15L. The upper joint flanges 61R and 61L are respectively welded, e.g., fillet-welded with the main frames 15R and 15L over the entire circumference thereof.

The second joint portions 56R and 56L are respectively provided at the other end of the bridge 21R and the other end of the bridge 21L. The second joint portion 56R includes a first joint flange portion 63R welded with the right side surface of the down tube 17, a second joint flange portion 64R welded with the upper surface of the down tube 17, and a third joint flange portion 65R that is connected with the first and second joint flange portions 63R and 64R and is separated from the down tube 17. Similarly, the second joint portion 56L includes a first joint flange portion 63L welded with the left side surface of the down tube 17, a second joint flange portion 64L welded with the upper surface of the down tube 17, and a third joint flange portion 65L that is connected with the first and second joint flange portions 63L and 64L and is separated from the down tube 17. The third joint flange portions 65R and 65L are joined by welding with each other so as to integrate the pair of right and left bridges 21R and 21L.

The welding part between the first joint portion 55L and the main frame 15L and the welding part between the second joint portion 56L and the down tube 17, i.e., the weld lines W are illustrated in FIG. 3. The welding part between the first joint portion 55R and the main frame 15R is similar to the welding part between the first joint portion 55L and the main frame 15L. The welding part between the second joint portion 56R and the down tube 17 is similar to the welding part between the second joint portion 56L and the down tube 17. In FIG. 4, the welding part between the second joint portions 56R and 56L and the down tube 17, i.e., the weld lines W are illustrated.

The first joint flange portion 63R of the right bridge 21R is joined with the right side surface of the down tube 17. The first joint flange portion 63L of the left bridge 21L is joined with the left side surface of the down tube 17. Each of the first joint flange portions 63R and 63L has such a tapered shape that the wraparound dimension to the side surface of the down tube 17 becomes shorter as being separated away from the head pipe 13. The outer circumference of each of the first joint flange portions 63R and 63L is welded, e.g., fillet-welded with the down tube 17.

Each of the second joint flange portions 64R and 64L is divided into two sections in the longitudinal direction of the down tube 17 with the third joint flange portion 65R or 65L interposed therebetween. The second joint flange portion 64R includes a front second joint flange portion 67R near the head pipe 13 and a rear second joint flange portion 68R distant from the head pipe 13. Similarly, the second joint flange portion 64L includes a front second joint flange portion 67L near the head pipe 13 and a rear second joint flange portion 68L distant from the head pipe 13. The front second joint flange portions 67R and 67L may have the same shape as the rear second joint flange portions 68R and 68L or may differ in shape from the rear second joint flange portions 68R and 68L. Each of the front second joint flange portions 67R and 67L of the present embodiment is larger in size than each of the rear second joint flange portions 68R and 68L. In other words, the front second joint flange portions 67R and 67L are in contact with the down tube 17 with a contact area larger than that of the rear second joint flange portions 68R and 68L. The second joint flange portions 64R and 64L (i.e., the front second joint flange portions 67R and 67L and the rear second joint flange portions 68R and 68L) are welded with the down tube 17 by, e.g., fillet-welding.

The front second joint flange portions 67R and 67L are in contact with the down tube 17, and there is a gap G between the front second joint flange portions 67R and 67L. This gap G enlarges the weldable outer peripheral length of each of the front second joint flange portions 67R and 67L. In other words, the gap G enlarges the welding length between the down tube 17 and each of the front second joint flange portions 67R and 67L. The rear second joint flange portions 68R and 68L may be formed so as to have a gap (not shown) between both for enlarging the welding length similarly to the front second joint flange portions 67R and 67L.

Each of the third joint flange portions 65R and 65L has a trapezoidal shape that becomes narrower in width as being separated away from the down tube 17 in a vehicle side view. The third joint flange portions 65R and 65L are separated from the down tube 17 so as to partition the space S as shown in FIG. 5. In FIG. 5, the two surfaces 71R and 71L are farthest from each other in the vehicle width direction among the inner surfaces of the third joined flange portions 65R and 65L, and are separated from each other to such a degree that the space S has a dimension in the vehicle width direction substantially equal to that of the down tube 17. In other words, the two surfaces 71R and 71L are separated from each other by the dimension that is equivalent to the width of the down tube 17 in the vehicle width direction. The space S may be a hollow space or may be filled with a foamed plastic such as a rigid polyurethane foam. The bridges 21R and 21L having the space S further improve the rigidity of the body frame 2 as compared with the case without the space S.

The third joint flange portion 65L on the left side and the third joint flange portion 65R on the right side are welded with each other. In other words, the right and left bridges 21R and 21L are integrated through the respective third joint flange portions 65R and 65L. For instance, it is preferable that the third joint flange portions 65R and 65L are butted-welded on both the inner and outer surfaces, i.e., on both the inside and the outside of the space S between the down tube 17 and the third joint flange portions 65R and 65L. In the case of welding the inner and outer surfaces of the third joint flange portions 65R and 65L, the bridges 21R and 21L are integrated beforehand and then welded to the main frames 15R and 15L and the down tube 17.

Each of the body portions 57R and 57L of the respective bridges 21R and 21L has a U-shaped cross-section that opens inward in the width direction of the motorcycle 1.

The boss portion 58 is formed integrally with the left bridge 21L. The boss portion 58 extends inward in the width direction of the motorcycle 1. A non-illustrated bracket for supporting components of the motorcycle 1 such as a wire harness is fixed to the boss portion 58 with a non-illustrated fastening member such as a bolt. Note that the boss portion 58 may be provided on the right bridge 21R or may be provided on each of the right and left bridges 21R and 21L.

The down tube 17 has a hole 73 connected to the space S that separates the down tube 17 from the third joint flange portions 65R and 65L. The hole 73 makes it easy to control the atmosphere in the case of welding the bridges 21R and 21L to the down tube 17.

As described above, the body frame structure 51 of the motorcycle 1 according to the embodiment of the present invention includes the third joint flange portions 65R and 65L that are separated from the down tube 17 and joined with each other by welding so as to integrate the pair of right and left bridges 21R and 21L. Consequently, the body frame structure 51 further improves the rigidity of the body frame 2 and further reduces a change in the behavior of the vehicle body.

In addition, the body frame structure 51 of the motorcycle 1 according to the embodiment of the present invention includes the body portion 57R that is bridged between the first and second joint portions 55R and 56R so as to be concavely curved inward in the width direction of the body frame structure 51, and further includes the body portion 57L that is bridged between the first and second joint portions 55L and 56L so as to be curved similarly. Consequently, the body frame structure 51 further improves the rigidity of the body frame 2 and can appropriately set the flexibility of the body frame 2.

Further, the body frame structure 51 of the motorcycle 1 according to the embodiment of the present invention includes the boss portions 58 that enables the components of the motorcycle 1 to be attached on the inner side surfaces of the bridges 21R and 21L. Consequently, the body frame structure 51 can efficiently utilize the space inside the body frame 2 by attaching the components of the motorcycle 1 to the body portions 57R and 57L in the open shape.

Furthermore, the body frame structure 51 of the motorcycle 1 according to the embodiment of the present invention includes the third joint flange portions 65R and 65L to be welded on both the outer and inner surfaces. Consequently, the body frame structure 51 can firmly integrate the right and left bridges 21R and 21L and can maintain the rigidity of the body frame 2.

Moreover, the body frame structure 51 of the motorcycle 1 according to the embodiment of the present invention includes the down tube 17 that has the hole 73 connected to the space S separating the down tube 17 from the third joint flange portions 65R and 65L. Consequently, the body frame structure 51 can stabilize welding quality between the down tube 17 and each of the bridges 21R and 21L.

Therefore, according to the body frame structure 51 of the motorcycle 1 of the embodiment of the present invention, it is possible to further improve the rigidity of the body frame 2 and further suppress the change in the behavior of the vehicle body.

What is claimed is:

1. A body frame structure of a motorcycle comprising:
   a head pipe;
   a right main frame and a left main frame, each of which is connected with the head pipe and extends rearward;
   a down tube connected with the head pipe and extending downward;
   a right reinforcing frame installed between the down tube and the right main frame; and
   a left reinforcing frame installed between the down tube and the left main frame,
   wherein each of the right reinforcing frame and the left reinforcing frame includes a first joint portion and a second joint portion joined to the down tube;
   wherein the first joint portion of the right reinforcing frame is joined to the right main frame;
   wherein the first joint portion of the left reinforcing frame is joined to the left main frame;
   wherein the second joint portion of the right reinforcing frame includes a first joint flange portion welded with a right side surface of the down tube, a second joint flange portion welded with an upper surface of the down tube, and a third joint flange portion that is connected with the first joint flange portion and the second joint flange portion and is separated from the down tube;
   wherein the second joint portion of the left reinforcing frame includes a first joint flange portion welded with a left side surface of the down tube, a second joint flange portion welded with the upper surface of the down tube, and a third joint flange portion that is connected with the first joint flange portion and the second joint flange portion and is separated from the down tube; and
   wherein the third joint flange portion of the second joint portion of the right reinforcing frame and the third joint flange portion of the second joint portion of the left reinforcing frame are welded with each other to integrate the right reinforcing frame and the left reinforcing frame.

2. The body frame structure of a motorcycle according to claim 1,
   wherein each of the right reinforcing frame and the left reinforcing frame includes a body portion that is bridged between the first joint portion and the second joint portion and is concavely curved toward inside in a width direction of the body frame structure.

3. The body frame structure of a motorcycle according to claim 2,
wherein at least one of the right reinforcing frame and the left reinforcing frame includes a boss portion that is provided on a corresponding inner surface of the right reinforcing frame and the left reinforcing frame and can mount on a component of the motorcycle.

4. The body frame structure of a motorcycle according to claim 1,
wherein the third joint flange portions are welded with both of an outer surface and an inner surface.

5. The body frame structure of a motorcycle according to claim 1,
wherein the down tube has a hole connected with a space that separates the down tube from the third joint flange portions.

6. The body frame structure of a motorcycle according to claim 2,
wherein the third joint flange portions are welded with both of an outer surface and an inner surface.

7. The body frame structure of a motorcycle according to claim 3,
wherein the third joint flange portions are welded with both of an outer surface and an inner surface.

8. The body frame structure of a motorcycle according to claim 2,
wherein the down tube has a hole connected with a space that separates the down tube from the third joint flange portions.

9. The body frame structure of a motorcycle according to claim 3,
wherein the down tube has a hole connected with a space that separates the down tube from the third joint flange portions.

10. The body frame structure of a motorcycle according to claim 4,
wherein the down tube has a hole connected with a space that separates the down tube from the third joint flange portions.

* * * * *